United States Patent
Kreuzer

(10) Patent No.: US 6,536,549 B2
(45) Date of Patent: Mar. 25, 2003

(54) METHOD FOR CONTROLLING THE STEERING ANGLE OF A STEERED WHEEL OF A VEHICLE AND A SYSTEM TO CARRY OUT THE METHOD

(75) Inventor: Martin Kreuzer, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/865,755

(22) Filed: May 25, 2001

(65) Prior Publication Data

US 2002/0027039 A1 Mar. 7, 2002

(30) Foreign Application Priority Data

May 26, 2000 (DE) .......................... 100 26 132

(51) Int. Cl.⁷ ................................. B62D 1/24
(52) U.S. Cl. .......................... 180/169; 180/402; 701/41
(58) Field of Search ................. 180/169, 167, 180/401, 402, 403, 443, 446, 421; 701/41, 42

(56) References Cited

U.S. PATENT DOCUMENTS

| | | | |
|---|---|---|---|
| 4,158,841 A | | 6/1979 | Wuchner et al. |
| 5,762,160 A | * | 6/1998 | Shimizu ..................... 180/169 |
| 5,826,677 A | * | 10/1998 | Nishizaki et al. ........... 180/169 |
| 6,148,943 A | * | 11/2000 | Kodaka et al. ............. 180/169 |
| 6,178,365 B1 | * | 1/2001 | Kawagoe et al. ........... 180/167 |
| 6,256,584 B1 | * | 7/2001 | Kodaka et al. ............. 180/167 |
| 6,338,015 B1 | * | 1/2002 | Kawagoe et al. ........... 180/167 |

FOREIGN PATENT DOCUMENTS

| | | |
|---|---|---|
| DE | 4416790 C1 | 6/1995 |
| DE | 19607429 A1 | 9/1997 |
| DE | 19720764 A1 | 11/1997 |
| DE | 19743726 A1 | 4/1998 |
| DE | 19749545 A1 | 5/1998 |
| DE | 19749582 A1 | 5/1999 |
| DE | 19749086 C1 | 8/1999 |
| EP | 0443643 B1 | 11/1995 |

* cited by examiner

*Primary Examiner*—Kevin Hurley
(74) *Attorney, Agent, or Firm*—Tarolli, Sundheim, Covell & Tummino L.L.P.

(57) ABSTRACT

The invention relates to a method for controlling the steering angle of a steered wheel of a vehicle and a system to carry out this method. A control unit (9) controls an adjustment drive (5, 7) to alter the steering angle of the steered wheel, upon an alteration to a position of a steering member (13). The extent of the alteration to the steering angle is dependent on whether an obstacle for the vehicle is detected or not by means of a distance meter (17) coupled with the control unit (9). If an obstacle is detected at high speeds, then steering angle alterations are possible which would not be permitted by the control unit at normal driving operation. Thereby, in emergency situations the driver is to be given the possibility of being able to drive past the obstacle by a steering response characteristic which is more intense.

9 Claims, 1 Drawing Sheet

METHOD FOR CONTROLLING THE STEERING ANGLE OF A STEERED WHEEL OF A VEHICLE AND A SYSTEM TO CARRY OUT THE METHOD

TECHNICAL FIELD

The invention relates to a method for controlling the steering angle of at least one steered wheel of a vehicle and a system to carry out the method.

BACKGROUND OF THE INVENTION

From the DE 197 02 313 C1 a method is known for controlling the steering angle of a vehicle, which has as its subject the so-called steering-by-wire. Here, the steering member, usually the vehicle steering wheel, is not coupled with the steered wheels of the vehicle in a mechanically rigid manner. Rather, a control unit is intercalated which, dependent on the signal which originates from the control member, actuates specific adjustment drives which alter the steering angle. The extent of the alteration to the steering angle can also be dependent here on the speed of the vehicle, i.e. the same steering turn on the steering member leads to different steering angles or changes to steering angles at different speeds, so that a vehicle travelling quickly reacts relatively slowly to steering turns. This has the following disadvantage: if an obstacle which appears abruptly has to suddenly be evaded, e.g. an animal jumping onto the roadway, the vehicle reacts too slowly to the abrupt, great steering locks.

BRIEF SUMMARY OF THE INVENTION

The invention provides a method for controlling the steering angle of a vehicle and a system suitable for carrying out the method, which offer a high degree of comfort at different vehicle speeds and a high degree of vehicle safety even in the case of obstacles which suddenly occur. The method proposed comprises the following steps:

- providing an adjustment drive coupled with the steering wheel and able to amend the steering angle,
- providing a steering member to be actuated by a driver to steer the vehicle,
- providing a control unit which is coupled with the steering member and the adjustment drive,
- providing a distance meter coupled with the control unit to detect an obstacle for the vehicle,
- the control unit controlling the adjustment drive to alter the steering angle, upon an alteration to a position of the steering member,
- the extent of the alteration to the steering angle being dependent on whether an obstacle for the vehicle is detected or not by means of the distance meter.

The method proposed makes provision that with a suddenly occurring obstacle, despite of a high speed for example, an alteration to the steering angle is possible, which is substantially greater than the alteration to the steering angle when travelling normally, i.e. without an obstacle. By means of the method, therefore, in extreme situations a more immediate steering of the vehicle can be achieved. Thereby it is possible in extreme situations to still evade an obstacle, which would not be possible with the methods conceived hitherto.

According to a development of the invention, the quantitative alteration to the steering angle (i.e. the extent of the steering angle alteration associated with a defined alteration to the position of the steering member) is dependent on the period of time after which the vehicle would strike against the obstacle. In concrete terms, this means that with the same steering turn of the steering member, the control unit provides for different steering angles on the wheels themselves, depending on how close in terms of time a collision with the obstacle is imminent. Therefore, the risk of a collision is to be determined and is to flow into the steering angle. With the same turn of the steering member, the control unit would provide for a smaller steering angle when the collision with the obstacle is still one second ahead than in the case in which the collision is only a few tenths of a second ahead, for example.

A further possibility for determining the likelihood of the collision with the obstacle consists in making the quantitative alteration to the steering angle dependent on the relative speed between the vehicle and the obstacle.

According to the preferred embodiment, the control unit also alters the steering angle quantitatively as a function of the speed of the vehicle. This means, as already previously explained, that the same steering turn on the steering member at higher speeds provides for a substantially smaller steering angle alteration than at low speeds. The extremes are, for example, high speed on motorways and low speeds, but high steering angle alterations, e.g. when parking the vehicle. Through the dependence on speed, provision is made that when parking great alterations to the steering angle are possible with relatively small steering turns and the vehicle does not act in a nervous manner at maximum speed, reacting to small steering locks.

A further development of the invention makes provision that a so-called ESP system (electronic stabilizing program) is integrated into the control unit. Thereby, the alteration to the steering angle is also dependent on the ambient conditions of the vehicle (in particular the friction value between wheels and roadway), whereby it is to be prevented that the steering turn angles which are possible at high speeds lead to skidding of the vehicle.

The system according to the invention for controlling the steering angle of at least on steered wheel of the vehicle comprises an adjustment drive coupled with the steering wheel and able to amend the steering angle, a steering member to be actuated by a driver to steer the vehicle, a control unit coupled with the steering member and the adjustment drive, and a distance meter coupled with the control unit to detect an obstacle for the vehicle. The control unit controls the adjustment drive to alter the steering angle, upon an alteration to a position of the steering member. Further, the control unit is able to amend an extent of the alteration to the steering angle dependent on whether an obstacle for the vehicle is detected or not by means of the distance meter.

In addition, a distance meter, in particular a distance radar, is provided, which is coupled with the control unit and which detects obstacles.

Preferably the system is also equipped with a speed sensor which is coupled with the control unit, so that a steering is possible dependent on the speed of the vehicle.

Advantageously the steering member is coupled electrically with the control unit. Furthermore, in one embodiment the invention makes provision that an ESP control is integrated into the system.

DETAILED DESCRIPTION OF THE PREFERRED EMBODIMENTS

Figure 1:
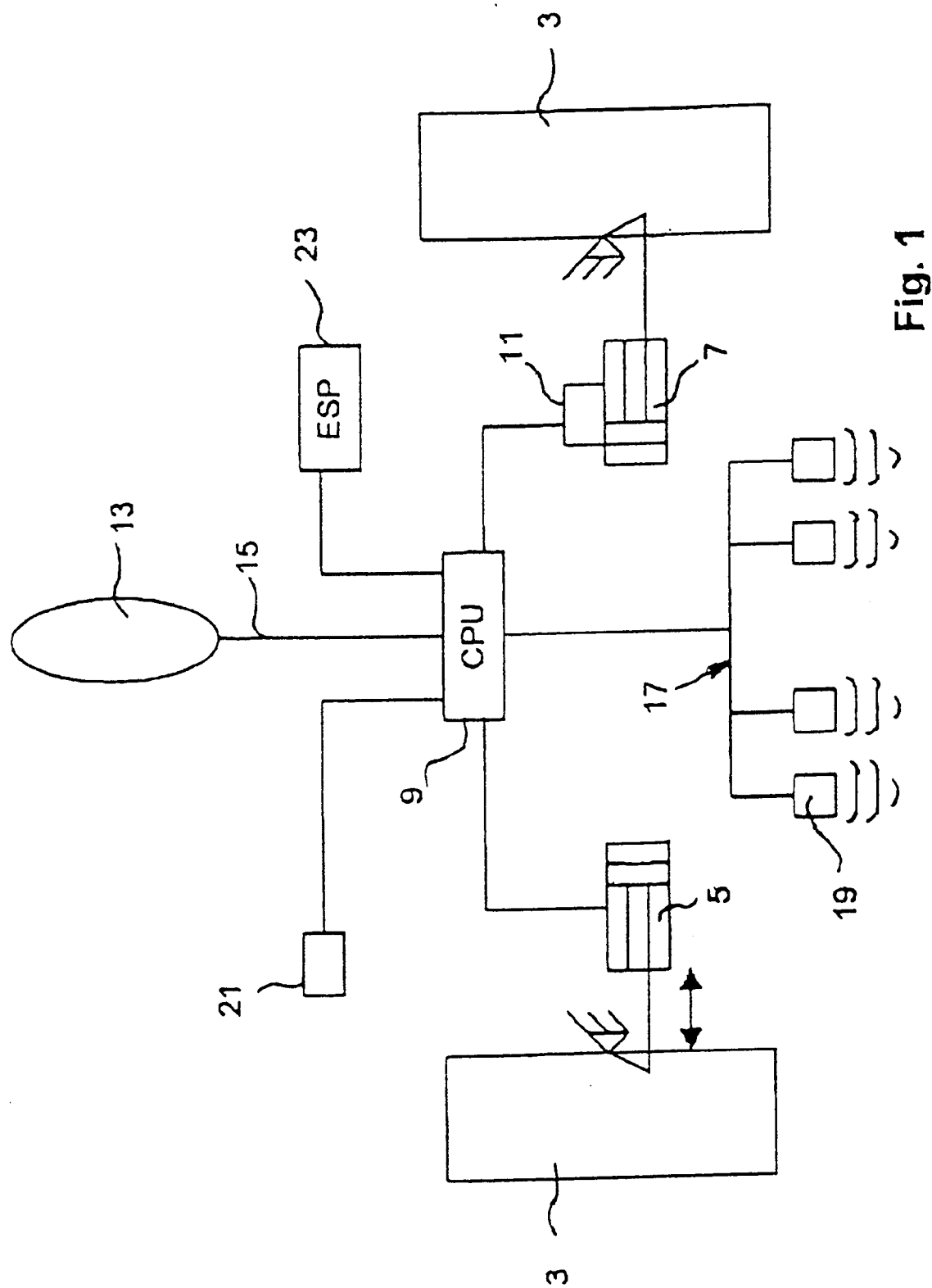
FIG. 1 shows a diagrammatic view of the system according to the invention to carry out the method according to the invention.

In FIG. 1 a system is illustrated for controlling the steering angle of steered wheels of a vehicle, the vehicle being symbolized by the two steered front wheels 3. The system has an individual adjustment drive for each wheel 3, which for example may be an electrical adjustment drive 5 or a pneumatic or hydraulic adjustment drive 7. By means of the adjustment drives, the steering angle of each wheel 3 is controlled. The adjustment drives 5, 7 are actuated and controlled by a central control unit 9, which is likewise part of the system. 11 denotes a valve which actuates the hydraulic adjustment drive 7. The central control unit is coupled electrically with a steering member 13, able to be actuated by the driver, the steering member 13 being a steering wheel or else another arrangement, e.g. a joystick, by which the vehicle can be steered. The electrical coupling of steering member 13 and control unit 9 is symbolized by an electrical line 15.

The control unit 9 is, in addition, electrically coupled with a distance meter 17 which consists of numerous sensors 19 accommodated in the region of the bumper of the vehicle. The sensors 19 are part of a distance radar which forms the distance meter 17. In addition to the distance meter 17, a vehicle speed sensor 21, which is arranged for example in the vicinity of the rear axle of the vehicle, also belongs to the system for controlling the steering angle. Optionally, the system may also be provided with a so-called ESP control system 23, which may be part of the control unit 9 or be coupled therewith.

The system according to the invention operates as follows. The steering angle of the wheels 3 is controlled in driving operation by the steering member 13. By means of sensors, not shown, the position of the steering member 13 and/or the alteration to the position of the steering member 13 is scanned, and corresponding signals are sent via the line 15 to the control unit 9. Chronologically parallel to this, a signal furnished by the speed sensor 21 is likewise conveyed to the control unit 9, this signal being characteristic of the current speed. The control unit 9 has stored for example a plurality of characteristic diagrams and determines on the basis of the incoming data the steering angle which is to be set and controls the adjustment drives 5, 7 accordingly, so that the desired actual steering angle is produced.

The control unit controls the steering angle here dependent on speed, which means that at low speeds a distinctly higher steering angle is set than at higher speeds, with the same steering turn on the control member 13. At the maximum speed of the vehicle, great alterations to the steering angle are scarcely still possible, so that the driver can be more relaxed when travelling.

During driving operation, the distance meter 17 continually determines whether the vehicle is driving towards an obstacle. The distance meter 17 and control unit 9 also determine here whether the object is moving with the vehicle (probably another vehicle travelling in front of the vehicle) or whether the vehicle and object are coming towards each other and the object therefore forms an obstacle for the vehicle, with which the vehicle is likely to collide.

If owing to the speed of the vehicle relative to the obstacle and the distance of the vehicle to the obstacle, a collision of the vehicle must be assumed, the control unit 9 provides for a more immediate steering than would be the case without the detected obstacle during normal driving operation. This means that with an intensive steering lock, an intensive alteration to the steering angle is also permitted, as would not otherwise be permitted at the corresponding speed of travel. Thereby, the driver is to be given the possibility of driving past the obstacle.

It is also possible to make the quantitative alteration to the steering angle dependent on the period of time after which the vehicle would strike against the obstacle. If, for example, sufficient time still exists to drive past the obstacle, then the control unit 9 could set a smaller steering angle than in the case of an obstacle arriving onto the roadway immediately in front of the vehicle. The quantitative alteration to the steering angle can also be made dependent on the relative speed between the vehicle and the obstacle.

The ESP control system 23 in turn makes provision that the steering angle permitted by the control unit 9 is also dependent on the ambient conditions. If, for example, the control unit were to set a large steering angle in order to evade the obstacle appearing immediately in front of the vehicle, of this steering angle led to a skid of the vehicle, the maximum steering angle would be set to an angle at which the vehicle still does not go into a skid. The ESP control may also be connected with the drive- or brake system and may control the braking of the vehicle.

What is claimed is:

1. A method for controlling a steering angle of at least one steered wheel of a vehicle, said method comprising the following steps:

providing an adjustment drive coupled with said steering wheel and able to amend said steering angle, providing a steering member to be actuated by a driver to steer said vehicle, providing a control unit which is coupled with said steering member and said adjustment drive, providing a distance meter coupled with said control unit to detect an obstacle for said vehicle, said control unit, upon an alteration to a position of said steering member caused by the driver of said vehicle, controlling said adjustment drive to alter said steering angle, the extent of said alteration to said steering angle being greater in the case where an obstacle for said vehicle is detected by means of said distance meter than in the case where no obstacle is detected.

2. The method according to claim 1, wherein said alteration to said steering angle is dependent on a period of time up to said vehicle striking onto said obstacle.

3. The method according to claim 1, wherein a quantitative alteration to said steering angle is dependent on a relative speed between said vehicle and said obstacle.

4. The method according to claim 1, wherein said control unit also alters said steering angle quantitatively as a function of a speed of said vehicle.

5. The method according to claim 1, wherein various characteristic diagrams are stored in said control unit, which are characteristic of an influence of various factors on said alteration to said steering angle.

6. The method according to claim 1, wherein said extent of said alteration to said steering angle is also dependent on ambient conditions.

7. A system for controlling a steering angle of at least one steered wheel of a vehicle, said system comprising:

an adjustment drive coupled with said steering wheel and able to amend said steering angle, a steering member to be actuated by a driver to steer said vehicle, a control unit coupled with said steering member and said adjustment drive, a distance meter coupled with said control unit to detect an obstacle for said vehicle, said control unit upon an alteration to a position of said steering member caused by the driver of said vehicle, controlling said adjustment drive to alter said steering angle, said control unit providing for a greater extent of said alteration to said steering angle in the case where an obstacle for said vehicle is detected by means of said distance meter than in the case where no obstacle is detected.

8. The system according to claim 7, characterized by a speed sensor coupled with said control unit.

9. The system according to claim 7, wherein said steering member is coupled electrically with said control unit.

* * * * *